W. K. HOWE.
AUTOMATIC TRAIN CONTROL SYSTEM.
APPLICATION FILED OCT. 10, 1921.
Reissued Nov. 29, 1921. 15,236.
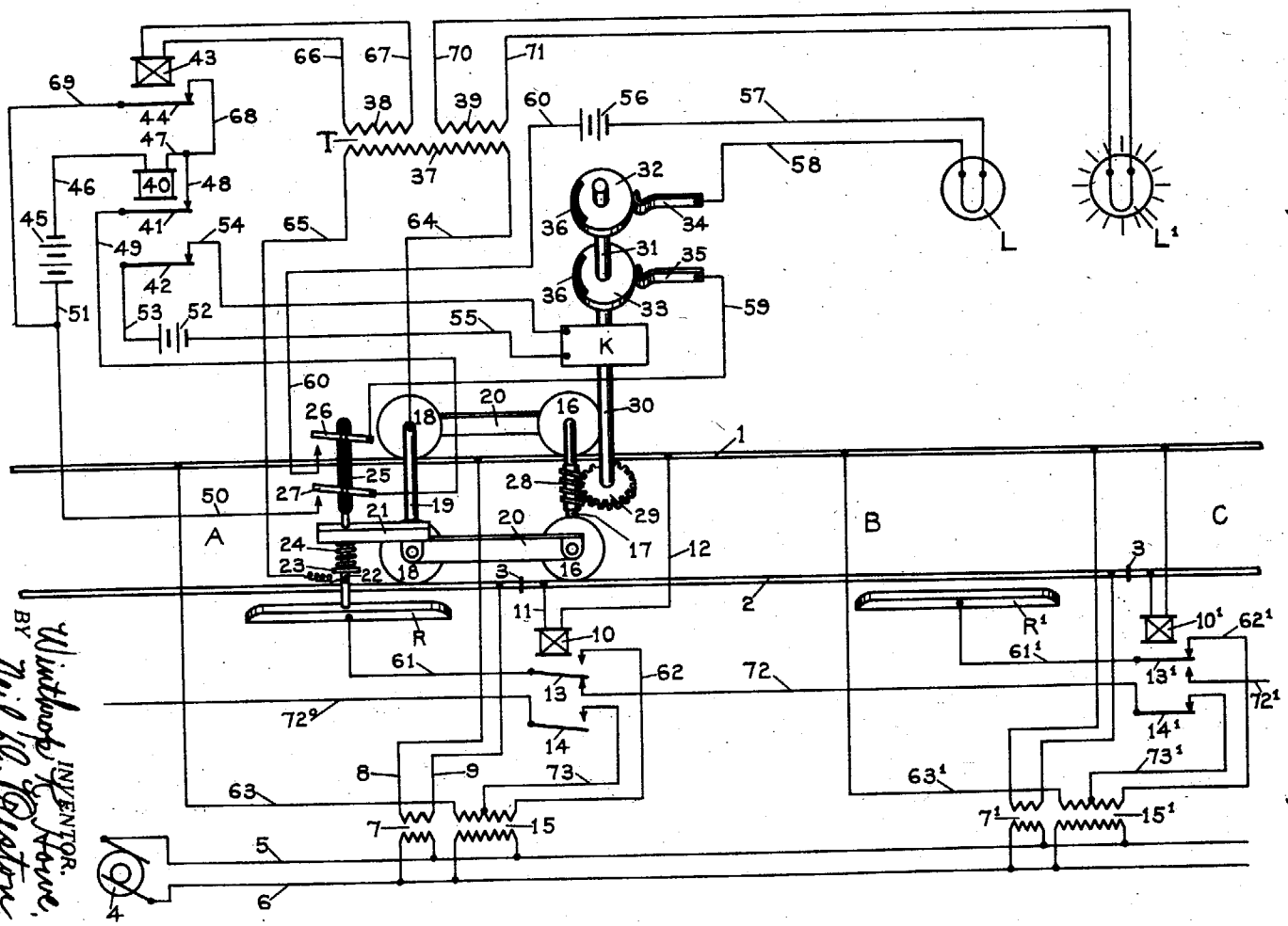
Winthrop K. Howe, INVENTOR.
BY Neil W. Preston, his ATTORNEY.

UNITED STATES PATENT OFFICE.

WINTHROP K. HOWE, OF ROCHESTER, NEW YORK, ASSIGNOR TO GENERAL RAILWAY SIGNAL COMPANY, OF GATES, NEW YORK, A CORPORATION OF NEW YORK.

AUTOMATIC TRAIN-CONTROL SYSTEM.

15,236. Specification of Reissued Letters Patent. Reissued Nov. 29, 1921.

Original No. 1,306,380, dated June 10, 1919, Serial No. 88,363, filed April 1, 1916. Application for reissue filed October 10, 1921. Serial No. 506,902.

*To all whom it may concern:*

Be it known that I, WINTHROP K. HOWE, a citizen of the United States, and a resident of the city of Rochester, in the county of Monroe and State of New York, have invented new and useful Improvements in Automatic Train-Control Systems, of which the following is a specification.

This invention relates to automatic train control systems, and more particularly to such systems in which the communication between a vehicle and the track upon which it travels is accomplished by the electrical coöperation of a contact shoe or similar device carried by the train with contact rails or ramps located at suitable points along said track. The invention also relates to those automatic train control systems in which the operation of the system depends in some way upon a moving part operatively connected to the wheels of the vehicle.

In the automatic train control systems having the characteristics above stated it is desirable to make suitable provision whereby the motorman or engineer will be immediately advised of any failure of the mechanism to operate properly, whether this failure is due to unavoidable breakage, improper adjustment or some other cause; and this invention has for its objects to devise a simple and reliable means for verifying the proper performance of certain of the parts of the system and for immediately informing the motorman or engineer of any failure of these parts to operate properly.

Other objects and advantages will appear as the description of the invention progresses, and the novel features of the invention will be particularly pointed out in the appended claims.

In describing the invention in detail, reference is had to the accompanying drawing, in which is illustrated the preferred physical embodiment of the invention, and in which the single figure is a diagrammatic view of the parts of a system for automatically controlling railway trains suitable for illustrating the features and characteristics of this invention and the manner of its application, these parts of the train control system, as well as the devices embodying the invention, being shown in a simplified form and arrangement, more with a view of making clear the features and characteristics of the invention rather than with a view of showing the exact shape, construction and location of the parts as they would be made and assembled in practice.

Referring to the accompanying drawing, 1 designates the track rail of an ordinary railroad track, the separate rail sections of which are electrically connected together so as to constitute an electrically continuous rail; and 2 designates the other track rail of the railroad track which is divided by insulating joints 3 into blocks A, B, and C of suitable length. The parts of the system along the track are supplied with current from an alternating generator 4 along the line wires 5 and 6. Since the devices and electrical connections associated with each block are the same, these devices and connections will be given the same reference characters for the respective blocks with distinctive exponents added thereto. Adjacent to one end of each block, preferably the exit end, is located a track transformer 7, the primary of which is connected across the line wires 5 and 6, and the secondary of which is connected across the track rails 1 and 2 by conductors 8 and 9. At the other end of each block a track relay 10 of suitable construction, capable of responding to alternating current, is connected across the track rails 1 and 2 by conductors 11 and 12, said track relay 10 having armatures 13 and 14 represented according to established convention. Associated with each block and located preferably near the entrance thereto is an insulated ramp R of suitable construction, which is arranged to coöperate with the contact shoe hereinafter described, carried by the vehicle, and which forms one terminal of the controlling partial circuits which are supplied with current form the ramp transformer 15 associated therewith, the primary of said transformer 15 being connected across the line wires 5 and 6. The connections to the secondary of the transformer 15 and the controlling partial circuits will not be described in detail, since these connections and said partial circuits will be fully set forth hereinafter in the description of the operation.

The vehicle is shown diagrammatically as comprising a pair of front wheels 16—16 connected by an axle 17, and a pair of rear wheels 18—18 connected by an axle 19, it being understood that said axles 17 and 19 are connected by the frame of the vehicle as represented by the side bars 20. The contact shoe may be supported in any suitable way on the vehicle, but is shown as mounted on a bracket 21 secured to the journal box of the axle 19, said bracket 21 being assumed for simplicity to be made of insulating material. The contact shoe is illustrated as comprising a vertical movable plunger 22 having a collar 23 secured thereto; and said plunger 22 is pressed downward by a compression spring 24 interposed between said collar 23 and the underside of the bracket 21. Secured to the upper end of the plunger or shoe 22 is a rod 25 of suitable insulating material carrying contact fingers 26 and 27, said rod 25 being larger than the shoe 22 so as to engage the upper face of the bracket 21 and limit the downward movement of the shoe 22.

In certain kinds of automatic train control systems the operation of the system is dependent in some way upon a part driven by the wheels of the vehicle as it moves along the track, this part being, for instance, a device for indicating the speed at which the vehicle is traveling, or a device for indicating or registering the distance traveled by the vehicle from a predetermined point. Such a train control apparatus connected to the wheels of the vehicle is shown conventionally in the drawing and designated by K. In these types of automatic train control systems it is desirable to detect the failure of any of the gearing connecting the train control apparatus and the wheels of the vehicle. While the connection between the wheels of the vehicle and the train control apparatus K may take various forms, this connection is illustrated in the drawing as comprising a worm 28 secured to the front axle 17 and meshing with a worm gear 29, which is fixed to the lower end of a shaft 30 supported in suitable bearings, said shaft 30 connecting to the train control apparatus K. Operatively connected with the shaft 30, but insulated therefrom, and constructed so as to be turned thereby, is a shaft 31; and secured to this shaft 31 are two contact rings or disks 32 and 33 which have segments of insulation 36 inserted in their peripheries and which are arranged to coöperate with suitable contact brushes 34 and 35.

The failure of certain parts of the train control system to operate properly may be brought to the attention of the motorman or engineer in different ways, but according to the particular embodiment of this invention illustrated, it is contemplated that the necessary information will be given the motorman or engineer by the lighting and extinction of suitable electric lamps L and $L^1$, which may be colored differently or made distinguishable in any other suitable way. The lamp L is intended to inform the motorman or engineer as to the condition of the operating connection between the wheels of the vehicle and the train control apparatus K, and also of the operating condition of the contact shoe 22, as will be explained more fully hereinafter. The lamp $L^1$ is intended to inform the motorman or engineer of the operation of the track relays of the different blocks as the vehicle passes over them, and also, in a general way, of the traffic conditions ahead of the vehicle.

The automatic train control apparatus K, is governed by a control relay 40, having two armatures 41 and 42; and said control relay 40 in turn is arranged to be governed by a relay 43, having an armature 44.

*Operation.*

When the contact shoe 22 is not in engagement with the ramp R and the parts of the system on the vehicle are in their normal position, the control relay 40 is normally energized by current from a local source on the vehicle, as a battery 45, by a circuit which may be traced as follows: Commencing at the battery 45, conductor 46, control relay 40, conductors 47 and 48, armature 41 of the control relay 40 in its upper position, conductor 49, contact finger 27 of the shoe 22 in its lower or closed position, and conductors 50 and 51 back to the battery 45.

When the control relay 40 is energized, the train control apparatus K is held in its normal or idle condition by current flowing in a circuit which may be traced as follows:

Commencing at the battery 52, which may be the same as the battery 45, conductor 53, armature 42 of the control relay 40 in its upper position, conductor 54, apparatus K, and conductor 55 back to the battery 52.

When the shoe 22 is not in contact with the ramp R and is in its lower position, current is intermittently supplied to the lamp L along a circuit which may be traced as follows:

Commencing at the battery 56, which may be the same as the battery 45, conductor 57, lamp L, conductor 58, brush 34, contact disk 32, shaft 31, contact disk 33, brush 35, conductor 59, contact finger 26 in its lower or closed position, and conductor 60 back to the battery 56.

It can be readily seen from the last traced circuit that if the operating connection between the wheels of the vehicle and the train control apparatus K is intact and is operating properly, the segments of insulation 36 of contact rings 32 and 33 will cause an intermittent interruption of this last traced circuit, thereby resulting in an intermittent lighting and extinction of the lamp L. If this operating connection is defective or broken, however, the light L will either remain lighted or will be extinguished permanently. In either case, the change from the continual flashing to the steady light or darkness would be quickly and readily noticed by the motorman or engineer. When the shoe 22 engages the ramp R, the contact finger 26 is raised and interrupts the circuit for lighting the lamp L, so that the lamp remains extinguished temporarily during the time the vehicle is passing the ramp.

To understand the control of the lamp $L^1$ and the manner in which it informs the motorman or engineer of the operation of certain parts of the system, it will be necessary to state briefly the operation of the trackway circuits and the control relay 40 and the relay 43. Assume that the vehicle is in the block A, and about to enter the block B, the shoe 22 being in contact with the ramp R but the front pair of wheels 16—16 not having yet entered the block B; and further assume that the vehicle has been proceeding unrestrained by the train control apparatus K, and the control relay 40 is energized. When the contact shoe 22 engages the ramp R, it is lifted and the contact finger 27 is operated, thereby interrupting the normally closed circuit hereinbefore traced for energizing the control relay 40, so that, unless current is supplied to said control relay by some other circuit, said control relay will be deënergized and its armatures will drop. In this connection it is noted that the armature 41 of the control relay 40 is included in the circuit for normally energizing said control relay, and consequently, after the control relay is once deënergized, the subsequent closing of the contact finger 27 by the disengagement of the shoe 22 from the ramp R will not reënergize said control relay. In short, each time the vehicle passes a ramp the control relay 40, which normally maintains the train control apparatus K in its idle condition, is cut off from the source of current normally keeping it energized; and unless the control relay is maintained energized by some other circuit, the train control apparatus K will be set into operation and will remain effective until the train passes the next ramp.

The current substituted for the current which normally energizes the control relay 40 is supplied along a circuit controlled by the relay 43; and the relay 43 in turn is governed by the trackway circuits as follows: If the block B is not occupied by another train, the track relay 10 is energized and its armatures are in their upper position, so that current is supplied from the secondary of the transformer 15 along the track to the primary of the transformer T on the vehicle along a circuit which may be traced as follows:

Commencing at one terminal of the secondary of the transformer 15, conductor 62, armature 13 of the track relay 10 in its upper position, conductor 61, ramp R, shoe 22, conductor 65, primary 37 of the transformer T, conductor 64, and thence by the axle 19 and the wheel 18 to the track rail 1, and along conductor 63 back to the other terminal of the secondary of the transformer 15.

This current in the primary 37 of the transformer T induces a current in the portion 38 of the secondary of said transformer, and this induced current flows along conductors 66 and 67 through the relay 43. The relay 43 is designed such that a certain amount of current is required to raise its armature 44, while less current is required to hold this armature 44 in its upper position if it is already there. The current in the primary 37 of the transformer T also induces a current in the portion 39 of the secondary of said transformer, and this induced current flows along conductors 70 and 71 through the lamp $L^1$. It is apparent that the brightness of the lamp $L^1$ is dependent upon the amount of current flowing in the primary 37 of the transformer T. Under the particular conditions under discussion, the entire voltage of the secondary of the transformer 15 is impressed across the terminals of the primary 37 of the transformer T; and the parts and windings are so constructed and proportioned, in a manner which will be apparent to those skilled in the art, that the relay 43 will be energized sufficiently to raise its armature 44, and the lamp $L^1$ will be brilliantly lighted. When the armature 44 of the relay 43 is raised, current is supplied to the control relay 40 along a circuit which may be traced as follows:

Commencing at the battery 45, conductor 46, control relay 40, conductors 47 and 68, armature 44 in its upper position and conductors 69 and 51 back to the battery 45.

In this way, although the circuit which normally energized the control relay 40 is broken, a substitute circuit for maintaining said control relay energized is established, this substitute circuit being dependent upon a difference of potential equivalent to the full voltage of the secondary of the transformer 15 existing between the track rail 1 and the ramp R.

As the vehicle progresses and its first pair of wheels 16—16 and the axle 17 actually enter the block B, the track relay 10 is shunted and deënergized. If the block C is not occupied by another train, current is suppplied from part of the secondary of the transformer $15^1$ to the primary 37 of the transformer T along a circuit which may be traced as follows:

Commencing at the intermediate tap in the secondary of the transformer $15^1$, conductor $73^1$, armature $14^1$ of the track relay $10^1$ in its upper position, conductor 72, armature 13 of the track relay 10 in its lower position, conductor 61, ramp R, shoe 22, conductor 65, primary 37 of the transformer T, conductor 64 and thence by the wheels and axles of the vehicle to the track rail 1 and along conductor $63^1$ back to the secondary of the transformer $15^1$.

Since only part of the full voltage of the secondary of the transformer $15^1$ is supplied by the last traced circuit to the primary 37 of the transformer T, a current induced in the secondary portions 38 and 39 is correspondingly of lower value than the current previously described; but since the armature 44 of the relay 43 is already in its upper position, this induced current is sufficient to hold this armature in its upper position. The lower current induced in the secondary portion 39 of the transformer T causes the lamp $L^1$ to grow dimmer, thereby advising the engineer or the motorman that the armature of the track relay 10 has dropped properly, and furthermore that the next block in advance, that is the block C, is not occupied.

If the block C is occupied by a train at the time the vehicle in question actually enters the block B, the armature $14^1$ of the track relay $10^1$ will be in its lower position and the circuit previously traced and including a portion of the secondary of the transformer $15^1$, is interrupted so that the primary 37 of the transformer T has no current flowing therein, and consequently there is no current in the secondary portions 38 and 39. When the current ceases to flow in the secondary portion 38 of the transformer T, the relay 43 is deënergized and its armature 44 drops; thereby interrupting the substitute circuit for energizing the control relay 40; and since the shoe 22 is on the ramp R at this time and the circuit normally energizing the control relay 40 is interrupted at the contact finger 27, the control relay 40 is deprived of all current and its armatures drop. The dropping of the armature 42 interrupts the circuit hereinbefore traced which normally energizes the train control apparatus K and maintains it in its idle condition, and consequently the train control apparatus K is set into operation. When the current ceases to flow into the secondary portion 39 of the transformer T, the lamp $L^1$ is extinguished, and since the motorman or engineer knows by reason of the fact that the lamp L is not lighted that the contact shoe 22 has not left engagement with the ramp R, he is advised by the extinguishing of the lamp $L^1$ at this time that the next block in advance, that is block C, is occupied.

From the foregoing it can be seen that the lamps L and $L^1$ are controlled in such a way as to enable the motorman or engineer to tell whether or not the gearing connecting the train control apparatus K and the wheels of the vehicle is in working order. He is also able to tell by the extinction of the lamp L as his train passes a ramp that the contact shoe 22 is properly adjusted so as to engage the ramp and has been operated properly. Also, the motorman or engineer is able to tell, as his train passes from one block into another from the lamp $L^1$ that the track relay of the block just entered has dropped by reason of the fact that the lamp $L^1$ is first lighted brilliantly and then dimly; and the lamp $L^1$ serves to impart the additional information of whether or not the next block in advance is occupied. The constant recurrence of the lighting and extinction of the lamps L and $L^1$ becomes quickly familiar to the motorman or engineer, so that he will immediately detect any failure of the parts controlling these lamps to operate properly; but it is apparent that, if desired, various forms of automatic devices responsive to the same cycle of making and breaking circuits and decrease of the flow of current therein may be used instead of the lamps L and $L^1$.

Although I have particularly described the construction of one physical embodiment of my invention, and explained the operation and principle thereof; nevertheless, I desire to have it understood that the form selected is merely illustrative, but does not exhaust the possible physical embodiments of the idea of means underlying my invention.

What I claim as new and desire to secure by Letters Patent of the United States, is:

1. In a train control system, in combination: a vehicle; train control apparatus thereon; means operatively connected to the wheels of the vehicle for governing said apparatus; a circuit; a circuit controlling device actuated by said means and periodically interrupting said circuit; and indicating means included in said circuit and acting while said connecting means is operating to give an arrestive indication that can be readily recognized by the operator of the vehicle.

2. In an automatic train control system, in combination: automatic train control apparatus on a vehicle including a movable part operatively connected to the wheels of the vehicle; traffic controlled means partly on the vehicle and partly along the track for governing the operation of said apparatus; an indicating device on the vehicle responsive to the movement of said part; and another indicating device governed by said traffic controlled means, said indicating devices when operated giving distinctive and arrestive indications that are readily perceptible and discernible by the operator of the vehicle.

3. In a train control system, in combination: a track; a vehicle adapted to travel on said track; train control apparatus on the vehicle; means operatively connected to the wheels of the vehicle for governing said apparatus; a circuit; a circuit controlling device actuated by said means and periodically interrupting said circuit; means on the vehicle and traffic controlled means along the track arranged in coöperative relation for governing said apparatus, means operated by the coöperation of said last mentioned means for interrupting said circuit; and an indicating device included in said circuit.

4. In a train control system, in combination: a track; a vehicle adapted to travel on said track; train control apparatus on the vehicle; means operatively connected to the wheels of the vehicle for governing said apparatus; a partial circuit on the vehicle for governing said apparatus, traffic controlled partial circuits along the track including sources of current of different voltages; means on the vehicle and located along the track in coöperative relation for establishing electrical communication between the partial circuit on the vehicle and the partial circuits along the track; and an indicating device responsive to the flow of current in the partial circuit on the vehicle.

5. In a train control system, in combination: a track divided into track circuit blocks; a vehicle adapted to travel over the track; a contact rail associated with each block; partial circuits associated with each block and terminating at the corresponding contact rail and at a track rail; said partial circuits including sources of current of different voltages and being governed by the track circuit of the corresponding block; a contact shoe arranged to make electrical contact with said contact rails; a partial circuit on the vehicle terminating at said contact shoe and at the wheels of the vehicle; train control apparatus on the vehicle governed by the partial circuit thereon; and an indicating device responsive to the flow of current in said partial circuit on the vehicle.

6. In a train control system, in combination: a track; a vehicle adapted to travel on said track; train control apparatus on the vehicle; means operatively connected to the wheels of the vehicle for governing said apparatus; means for automatically controlling said apparatus; a circuit; a circuit controlling device actuated by said first mentioned means for periodically interrupting said circuit; and an indicating device included in said circuit and concurrently discernible by the operator of the vehicle, whereby he can immediately detect failure of said connecting means.

7. In a train control system, in combination: a track divided into insulated track circuit sections; a vehicle adapted to travel on said track; means for communicating between said vehicle and said trackway comprising a circuit controlling device; a train control apparatus on the vehicle automatically governed by said means and operatively connected to the wheels of the vehicle; a circuit automatically controlled by said means; other circuit controlling means actuated by said apparatus for periodically interrupting said circuit; indicating means included in said circuit; and other indicating means, governed by said first mentioned means, selectively responsive to the presence of a train on said track circuit sections.

8. In a train control system, in combination: a track divided into track circuit blocks; a vehicle adapted to travel over the track; a contact rail associated with each block; partial circuits associated with each block and terminating at the corresponding contact rail and at a track rail; said partial circuits including sources of current of different voltages and being governed by the track circuit of the corresponding block; a contact shoe arranged to make electrical contact with the contact rails; a partial circuit on the vehicle terminating at said shoe and at the wheels of the vehicle; train control apparatus on the vehicle; a relay for controlling said apparatus; a circuit for said relay including a contact controlled thereby which is closed when the relay is energized; means responsive to the flow of current in the partial circuit on said vehicle for controlling said relay regardless of its electrical condition; and indicating means responsive to the flow of current in said partial circuit on said vehicle and to the presence of a train on another of said track circuit sections.

9. In a train control system, in combination: a track divided into track circuit blocks; a vehicle adapted to travel over the track; train control apparatus on the vehicle; means operatively connected to the wheels of the vehicle for governing said apparatus; means for communicating between the track and said vehicle; a relay governed by said last mentioned means for automatically controlling said apparatus; a circuit; circuit controlling means actuated by said apparatus for periodically interrupting said circuit; indicating means included in said circuit; and other indicating means governed by said communicating means, said indicating means being both located and adapted to be observable by the operator of the vehicle.

10. In a train control system, in combination: a track divided into track circuit blocks; a vehicle adapted to travel over said track; train control apparatus on the vehicle; means operatively connected to the wheels of the vehicle for governing said apparatus; means for communicating between the vehicle and the track; and means concurrently perceptible by the operator of the vehicle and governed by said last mentioned means for indicating the operative condition of said communicating means of said apparatus.

11. In a train control system, in combination: a track divided into track circuit blocks; a vehicle adapted to travel over said track; train control apparatus on the vehicle; means operatively connected to the wheels of the vehicle for governing said apparatus; a partial circuit on the vehicle; traffic controlled partial circuits along the track including sources of current of different voltages; means on the vehicle and along the track for establishing electrical communication between the partial circuit on the vehicle and the partial circuits along the track; a relay for automatically controlling said apparatus; a pickup circuit for said relay controlled by the partial circuit on the vehicle; a holding circuit for said relay controlled by said second mentioned means; indicating means controlled by said partial circuits; and other indicating means controlled by said second mentioned means.

12. In a train control system, in combination: a vehicle and a track therefor; a contact shoe carried by the vehicle and comprising a circuit controller having a plurality of circuit controlling positions; train control apparatus on the vehicle; means operatively connected to the wheels of the vehicle for governing said apparatus; controlling circuits for said apparatus governed by said shoe; ramps located at intervals along the track for operating said shoe having their electrical controlling condition dependent on the extent of occupied track in advance thereof; and electroresponsive means for pointing out to the operator of the vehicle the operation and electrical condition of said shoe.

13. In an automatic train control system, in combination: automatic train control apparatus including a moving part and having its predetermined operation dependent upon the movement of said part; and indicating means on the vehicle adapted to give a distinctive and an arrestive indication so long as said part is in motion and automatically cease to give such indication when said part ceases to move.

14. In an automatic train control system, in combination: automatic train control apparatus on a vehicle, including a moving part and having its predetermined operation dependent upon the movement of said part; and visual indicating means disposed in the cab of the vehicle and governed by said moving part, said indicating means having a distinctive appearance only so long as said part is in motion.

15. In an automatic train control system, in combination: automatic train control apparatus on a vehicle including a shaft connected to the wheels of the vehicle and moved in accordance with the movement of said wheels; a circuit; means operated by said shaft for periodically interrupting said circuit; and a safety device included in said circuit and responsive to the periodic interruptions thereof.

16. In an automatic train control system, in combination: a railroad track divided into track circuit blocks each having a track relay; a ramp located at the entrance to each block; means controlled by the track relay of the corresponding block for modifying the electrical condition of each ramp when the wheels of the train enter that block; a contact shoe carried by the vehicle and adapted to coöperate with said ramps, said shoe remaining in electrical contact with each ramp until the vehicle has entered the corresponding block; a partial circuit on the vehicle energized by the current supplied from said ramps; and means responsive to the flow of current in said partial circuit for indicating the change in the electrical condition of said ramps as the vehicle passes them, whereby an indication is obtained in the cab to show the operation of each track relay.

17. In an automatic train control system, in combination: a track divided into blocks each provided with a track circuit and a track relay; impulse transmitting means at the entrance to each block having its controlling condition changed by the operation of the track relay of that block; impulse receiving means on a vehicle adapted to cooperate with the impulse transmitting means in each block both prior and subsequent to the entrance of the vehicle into that block; and indicating means on the vehicle acting to indicate the change in the controlling condition of the impulse transmitting means of each block incident to the operation of its track relay by a passing vehicle.

18. In an automatic train control system, in combination: a track divided into blocks each provided with a track circuit and a track relay; an impulse device at the entrance to each block having its controlling condition changed by the operation of the track relay of that block; a circuit on a vehicle influenced by the controlling condition of said impulse devices both prior and subsequent to the entrance of the vehicle into the corresponding block; and an indicating device on the vehicle governed by said circuit.

WINTHROP K. HOWE.